(12) United States Patent
Lu et al.

(10) Patent No.: US 9,735,692 B1
(45) Date of Patent: Aug. 15, 2017

(54) ADAPTER WITH LOW STANDBY LOSS AND ELECTRONIC SYSTEM WITH LOW STANDBY LOSS

(71) Applicant: Chicony Power Technology Co., Ltd., New Taipei (TW)

(72) Inventors: Jung-Chang Lu, New Taipei (TW); Chien-Hung Chen, New Taipei (TW); Fa-Ping Wang, New Taipei (TW); Chung-Shu Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/224,890

(22) Filed: Aug. 1, 2016

(51) Int. Cl.
   *H02M 3/335* (2006.01)
   *H02M 1/42* (2007.01)

(52) U.S. Cl.
   CPC ......... *H02M 3/33569* (2013.01); *H02M 1/42* (2013.01)

(58) Field of Classification Search
   CPC ............ H02M 3/335; H02M 3/33507; H02M 3/33523; H02M 3/33569; H02M 3/33592; H02M 1/0032; H02M 1/0042; H02M 1/32; H02M 1/36
   USPC ............... 363/21.01–21.18, 65–70
   See application file for complete search history.

(56) References Cited

U.S. PATENT DOCUMENTS 7,173,833 B2   2/2007   Lin et al.

2013/0272031 A1*  10/2013  Hosotani ........... H02M 3/33569
                                                       363/16
2015/0162845 A1*   6/2015  Lee ................... H02M 3/33569
                                                       363/17

FOREIGN PATENT DOCUMENTS

| TW | 201114143 A | 4/2011 |
|----|-------------|--------|
| TW | M463466 U   | 10/2013 |
| TW | M512261 U   | 11/2015 |
| TW | 201605151   | 2/2016 |
| TW | 201611471 A | 3/2016 |

OTHER PUBLICATIONS

Taiwan Office Action dated Feb. 2, 2017 issued in TW Application No. 105118933.

* cited by examiner

*Primary Examiner* — Yemane Mehari
(74) *Attorney, Agent, or Firm* — Muncy, Geissler, Olds & Lowe, P.C.

(57) ABSTRACT

An adapter includes a rectifying unit, a power factor correction unit, a standby circuit, a load-connecting detection circuit, a first power conversion circuit, a second power conversion circuit and an auxiliary voltage control circuit. When a load apparatus is connected to the adapter, a first ground side of the first power conversion circuit is short-circuited to a second ground side of the second power conversion circuit, so that the load-connecting detection circuit is turned on and sends out a first signal. After the auxiliary voltage control circuit receives the first signal, the auxiliary voltage control circuit is turned on to drive the first power conversion circuit and the second power conversion circuit, so that the first power conversion circuit and the second power conversion circuit start to convert a first voltage into a first output voltage and a second output voltage.

19 Claims, 6 Drawing Sheets

ADAPTER WITH LOW STANDBY LOSS AND ELECTRONIC SYSTEM WITH LOW STANDBY LOSS

BACKGROUND OF THE INVENTION

Field of the Invention

The present invention relates to an adapter and an electronic system, and especially relates to an adapter with low standby loss and an electronic system with low standby loss.

Description of the Related Art

The adapter is a very common electronic apparatus. Usually, the adapter receives and converts the alternating current power into the direct current power, and then outputs the direct current power to the load apparatus in the back end to drive the load apparatus. Therefore, the adapter is very important in the electronic area.

Generally speaking, when the adapter is not connected to the load apparatus, the adapter stops converting and outputting power to enter the standby mode. In the standby mode, in order to make the adapter enter the workable status more quickly, the circuit inside the adapter still has standby loss, which causes the wastage of the energy. Moreover, when the adapter is re-connected to the load apparatus, the adapter has to auto re-start quickly and accurately to supply power to the load apparatus in the back end.

However, the disadvantages of the current adapter are that the standby loss is too high thus causing the wastage of the energy, and the auto re-starting when the adapter is re-connected to the load apparatus is not quick and accurate. These problems need to be resolved.

SUMMARY OF THE INVENTION

In order to solve the above-mentioned problems, an object of the present invention is to provide an adapter with low standby loss.

In order to solve the above-mentioned problems, another object of the present invention is to provide an electronic system with low standby loss.

In order to achieve the object of the present invention mentioned above, the adapter supplies power to a load apparatus. The adapter comprises a rectifying unit, a power factor correction unit, a standby circuit, a load-connecting detection circuit, a first power conversion circuit, a second power conversion circuit and an auxiliary voltage control circuit. The power factor correction unit is electrically connected to the rectifying unit. The power factor correction unit sends out a first voltage. The standby circuit is electrically connected to the power factor correction unit. The standby circuit converts the first voltage into a second voltage and a third voltage. The load-connecting detection circuit is electrically connected to the standby circuit. The load-connecting detection circuit receives the second voltage. The first power conversion circuit is electrically connected to the power factor correction unit. The first power conversion circuit comprises a first output side and a first ground side. The first ground side is electrically connected to the load-connecting detection circuit. The second power conversion circuit is electrically connected to the power factor correction unit. The second power conversion circuit comprises a second output side and a second ground side. The second ground side is electrically connected to the load-connecting detection circuit. The first ground side and the second ground side are connected to different grounds. The auxiliary voltage control circuit is electrically connected to the standby circuit, the first power conversion circuit and the second power conversion circuit. The auxiliary voltage control circuit receives the third voltage. When the load apparatus is not connected to the adapter, a voltage of the first ground side is different from a voltage of the second ground side, so that the load-connecting detection circuit does not send out a first signal. The auxiliary voltage control circuit does not receive the first signal, so that the auxiliary voltage control circuit does not drive the first power conversion circuit and the second power conversion circuit, so that the first power conversion circuit and the second power conversion circuit does not convert the first voltage into a first output voltage and a second output voltage. When the load apparatus is connected to the adapter, the first ground side is short-circuited to the second ground side, so that the load-connecting detection circuit is turned on and sends out the first signal. After the auxiliary voltage control circuit receives the first signal, the auxiliary voltage control circuit is turned on to send out a fourth voltage to drive the first power conversion circuit and the second power conversion circuit, so that the first power conversion circuit and the second power conversion circuit start to convert the first voltage into the first output voltage and the second output voltage.

In order to achieve another object of the present invention mentioned above, the electronic system comprises an adapter and a load apparatus. The load apparatus is electrically connected to the adapter. The adapter comprises a rectifying unit, a power factor correction unit, a standby circuit, a load-connecting detection circuit, a first power conversion circuit, a second power conversion circuit and an auxiliary voltage control circuit. The power factor correction unit is electrically connected to the rectifying unit. The power factor correction unit sends out a first voltage. The standby circuit is electrically connected to the power factor correction unit. The standby circuit converts the first voltage into a second voltage and a third voltage. The load-connecting detection circuit is electrically connected to the standby circuit. The load-connecting detection circuit receives the second voltage. The first power conversion circuit is electrically connected to the power factor correction unit. The first power conversion circuit comprises a first output side and a first ground side. The first ground side is electrically connected to the load-connecting detection circuit. The second power conversion circuit is electrically connected to the power factor correction unit. The second power conversion circuit comprises a second output side and a second ground side. The second ground side is electrically connected to the load-connecting detection circuit. The first ground side and the second ground side are connected to different grounds. The auxiliary voltage control circuit is electrically connected to the standby circuit, the first power conversion circuit and the second power conversion circuit. The auxiliary voltage control circuit receives the third voltage. When the load apparatus is not connected to the adapter, a voltage of the first ground side is different from a voltage of the second ground side, so that the load-connecting detection circuit does not send out a first signal. The auxiliary voltage control circuit does not receive the first signal, so that the auxiliary voltage control circuit does not drive the first power conversion circuit and the second power conversion circuit, so that the first power conversion circuit and the second power conversion circuit does not convert the first voltage into a first output voltage and a second output voltage. When the load apparatus is connected to the adapter, the first ground side is short-circuited to the second ground side, so that the load-connecting detection circuit is turned on and sends out the first signal. After the auxiliary voltage control circuit receives the first signal, the auxiliary voltage control circuit is turned on to send out a fourth voltage to drive the first power conversion circuit and the second power conversion circuit, so that the first power conversion circuit and the second power conversion circuit start to convert the first voltage into the first output voltage and the second output voltage.

The advantage of the present invention is that when the load apparatus is not connected to the adapter, because the voltage of the first ground side of the first power conversion circuit is different from the voltage of the second ground side of the second power conversion circuit, the first power conversion circuit and the second power conversion circuit are not driven and do not work and do not consume energy, so that the standby loss of the adapter is very low. On the other hand, when the load apparatus is connected to the adapter, the first ground side of the first power conversion circuit is short-circuited to the second ground side of the second power conversion circuit, so that the voltage of the first ground side of the first power conversion circuit is the same with the second ground side of the second power conversion circuit, so that the first power conversion circuit and the second power conversion circuit are driven to supply power to the load apparatus. Therefore, the auto re-starting of the adapter is quick and accurate.

DETAILED DESCRIPTION OF THE INVENTION

Please refer to following detailed description and figures for the technical content of the present invention. The following detailed description and figures are referred for the present invention, but the present invention is not limited to it.

Figure 1:
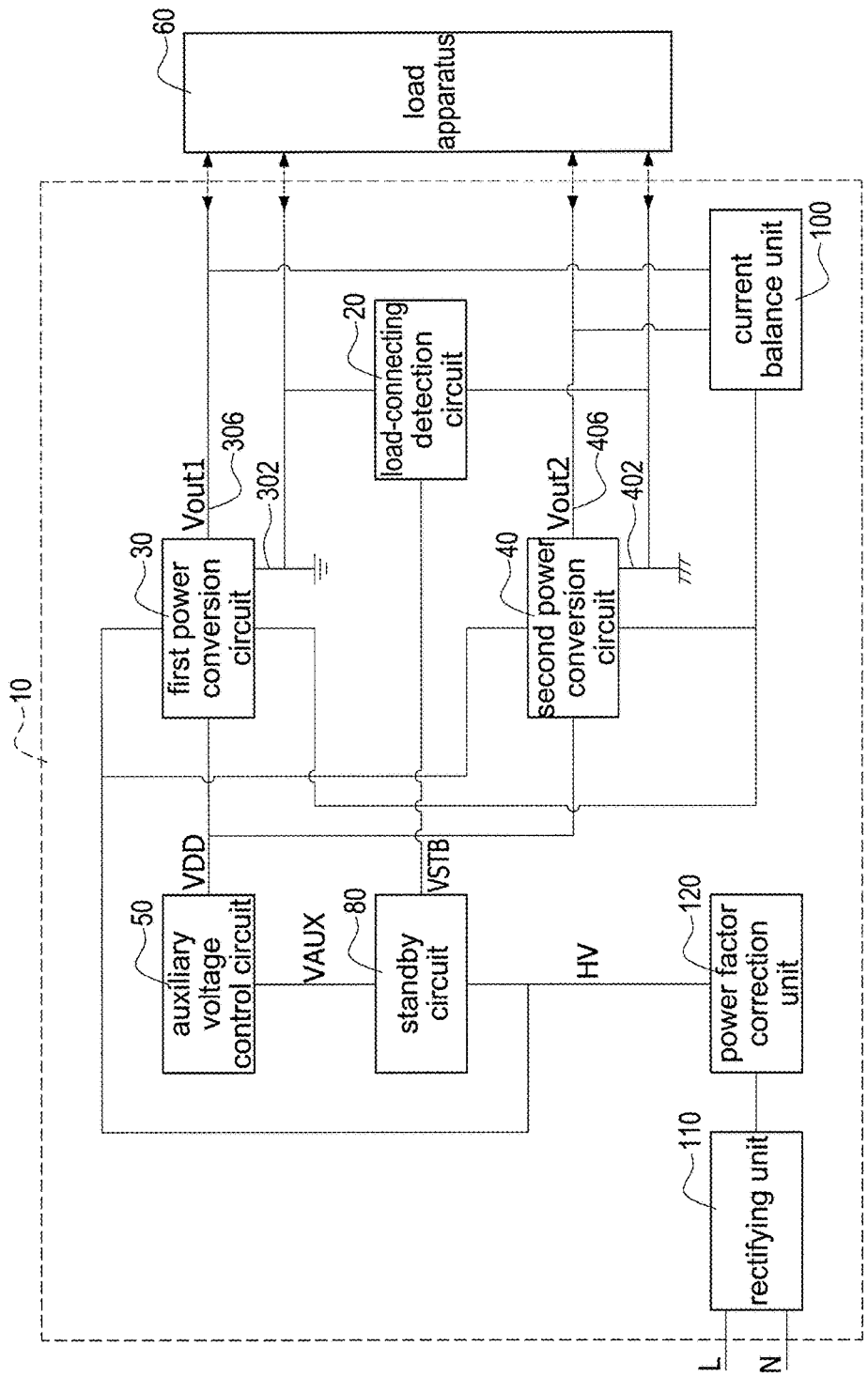
FIG. 1 shows a block diagram of an embodiment of the adapter of the present invention.

FIG. 1 shows a block diagram of an embodiment of the adapter of the present invention. An adapter 10 with low standby loss supplies power to a load apparatus 60. The adapter 10 comprises a rectifying unit 110, a power factor correction unit 120, a standby circuit 80, a load-connecting detection circuit 20, a first power conversion circuit 30, a second power conversion circuit 40, an auxiliary voltage control circuit 50 and a current balance unit 100. The first power conversion circuit 30 comprises a first output side 306 and a first ground side 302. The second power conversion circuit 40 comprises a second output side 406 and a second ground side 402.

The rectifying unit 110 is electrically connected to a live wire L and a neutral wire N. The power factor correction unit 120 is electrically connected to the rectifying unit 110. The standby circuit 80 is electrically connected to the power factor correction unit 120. The load-connecting detection circuit 20 is electrically connected to the standby circuit 80. The first power conversion circuit 30 is electrically connected to the power factor correction unit 120. The first ground side 302 is electrically connected to the load-connecting detection circuit 20. The second power conversion circuit 40 is electrically connected to the power factor correction unit 120. The second ground side 402 is electrically connected to the load-connecting detection circuit 20. The auxiliary voltage control circuit 50 is electrically connected to the standby circuit 80, the first power conversion circuit 30 and the second power conversion circuit 40. The current balance unit 100 is electrically connected to the first power conversion circuit 30, the first output side 306, the second power conversion circuit 40 and the second output side 406.

The power factor correction unit 120 sends out a first voltage HV to the standby circuit 80, the first power conversion circuit 30 and the second power conversion circuit 40. The standby circuit 80 converts the first voltage HV into a second voltage VSTB and a third voltage VAUX. The standby circuit 80 sends the second voltage VSTB to the load-connecting detection circuit 20. The standby circuit 80 sends the third voltage VAUX to the auxiliary voltage control circuit 50. The load-connecting detection circuit 20 receives the second voltage VSTB. The auxiliary voltage control circuit 50 receives the third voltage VAUX.

Firstly, one of the technical features of the present invention is that according to the printed circuit board layout and manufacturing technology, the first ground side 302 and the second ground side 402 are connected to different grounds, so that a voltage of the first ground side 302 is not equal to a voltage of the second ground side 402. Only when the load apparatus 60 is connected to the adapter 10, the first ground side 302 is short-circuited to the second ground side 402, so that the voltage of the first ground side 302 is equal to the voltage of the second ground side 402. This will be described in details as following.

When the load apparatus 60 is not connected to the adapter 10, the voltage of the first ground side 302 is not equal to the voltage of the second ground side 402, so that the load-connecting detection circuit 20 does not send out a first signal (will be described in details later). The auxiliary voltage control circuit 50 does not receive the first signal, so that the auxiliary voltage control circuit 50 does not drive the first power conversion circuit 30 and the second power conversion circuit 40, so that the first power conversion circuit 30 and the second power conversion circuit 40 does not convert the first voltage HV into a first output voltage Vout1 and a second output voltage Vout2.

When the load apparatus 60 is not connected to the adapter 10, because the voltage of the first ground side 302 of the first power conversion circuit 30 is different from the voltage of the second ground side 402 of the second power conversion circuit 40, the first power conversion circuit 30 and the second power conversion circuit 40 are not driven and do not work and do not consume energy, so that the standby loss of the adapter 10 is decreased. The standby loss is less than 0.5 watt.

When the load apparatus 60 is connected to the adapter 10, the first ground side 302 is short-circuited to the second ground side 402 (namely, the voltage of the first ground side 302 is equal to the voltage of the second ground side 402), so that the load-connecting detection circuit 20 is turned on and sends out the first signal (will be described in details later). After the auxiliary voltage control circuit 50 receives the first signal, the auxiliary voltage control circuit 50 is turned on to send out a fourth voltage VDD to drive the first power conversion circuit 30 and the second power conversion circuit 40, so that the first power conversion circuit 30 and the second power conversion circuit 40 start to convert the first voltage HV into the first output voltage Vout1 and the second output voltage Vout2 to send to the load apparatus 60.

When the load apparatus 60 is connected to the adapter 10, the first ground side 302 of the first power conversion circuit 30 is short-circuited to the second ground side 402 of the second power conversion circuit 40, so that the first power conversion circuit 30 and the second power conversion circuit 40 are driven to supply power to the load apparatus 60. Therefore, the auto re-starting of the adapter 10 is quick and accurate.

The current balance unit 100 detects current values of the first output side 306 and the second output side 406, and sends out a second signal to the first power conversion circuit 30 and the second power conversion circuit 40.

In another embodiment of the present invention, the electronic system with low standby loss can comprise the adapter 10 and the load apparatus 60 mentioned above. When the load apparatus 60 is not connected to the adapter 10, the voltage of the first ground side 302 is different from the voltage of the second ground side 402, so that the adapter 10 does not output the voltage to the load apparatus 60. When the load apparatus 60 is connected to the adapter 10, the first ground side 302 is short-circuited to the second ground side 402, so that the adapter 10 outputs the voltage to the load apparatus 60.

Figure 5:
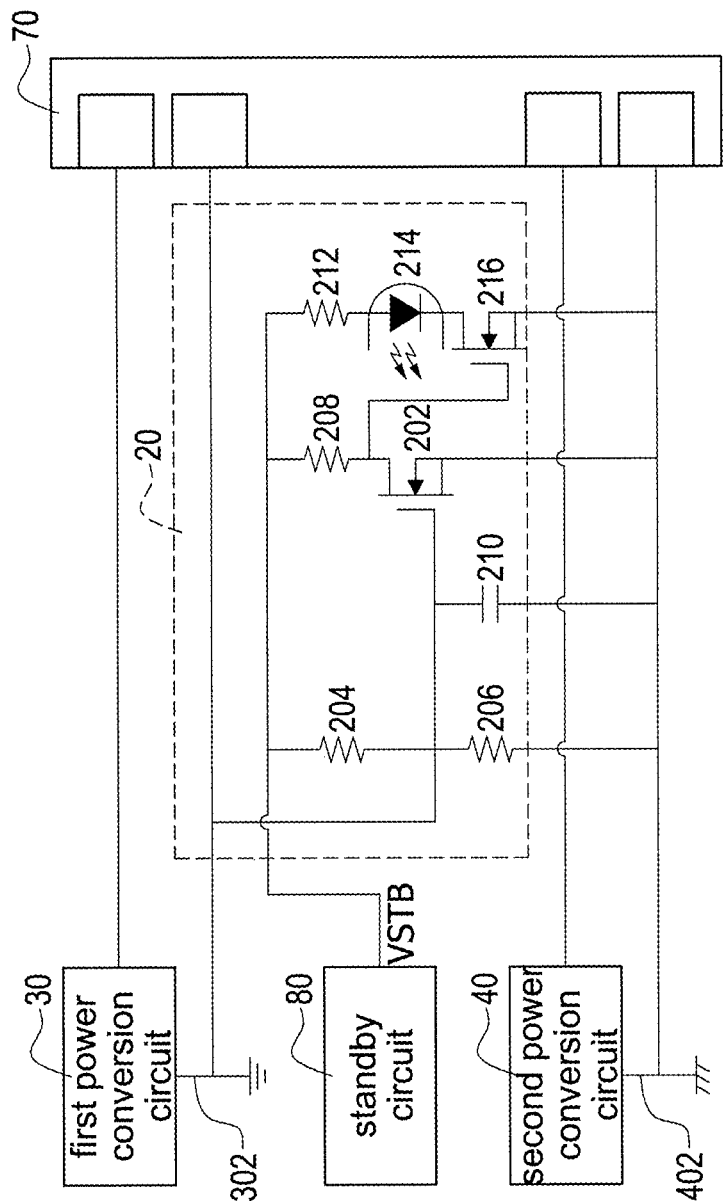
FIG. 5 shows a circuit diagram of an embodiment of the load-connecting detection circuit of the present invention.

FIG. 5 shows a circuit diagram of an embodiment of the load-connecting detection circuit of the present invention. The adapter 10 further comprises a first connector 70. The load-connecting detection circuit 20 comprises a first transistor switch 202, a photo coupler transmitting side 214, a second transistor switch 216, a first resistor 204, a second resistor 206, a third resistor 208, a first capacitor 210 and a fourth resistor 212.

The first transistor switch 202 is electrically connected to the first power conversion circuit 30, the first resistor 204, the second resistor 206, the third resistor 208, the first capacitor 210, the first connector 70 and the second transistor switch 216. The photo coupler transmitting side 214 is electrically connected to the second transistor switch 216 and the fourth resistor 212. The standby circuit 80 is electrically connected to the first resistor 204, the third resistor 208 and the fourth resistor 212. The second power conversion circuit 40 is electrically connected to the second resistor 206, the first capacitor 210, the first transistor switch 202, the second transistor switch 216 and the first connector 70.

Moreover, please refer to FIG. 1 at the same time. When the load apparatus 60 is not connected to the adapter 10, because the first ground side 302 and the second ground side 402 are connected to different grounds, the voltages of the first ground side 302 and the second ground side 402 are different, so that the first transistor switch 202 is turned on, and then the second transistor switch 216 is turned off, and then the photo coupler transmitting side 214 is turned off, and then the photo coupler transmitting side 214 does not send out the first signal (will be described in details later).

When the load apparatus 60 is connected to the adapter 10, the first ground side 302 is short-circuited to the second ground side 402, so that the voltages of the first ground side 302 and the second ground side 402 are the same, so that the first transistor switch 202 is turned off, and then the second transistor switch 216 is turned on by the second voltage VSTB, and then the photo coupler transmitting side 214 is turned on (namely, the second transistor switch 216 and the photo coupler transmitting side 214 are turned on by the second voltage VSTB). The photo coupler transmitting side 214 sends out the first signal (will be described in details later).

Figure 6:
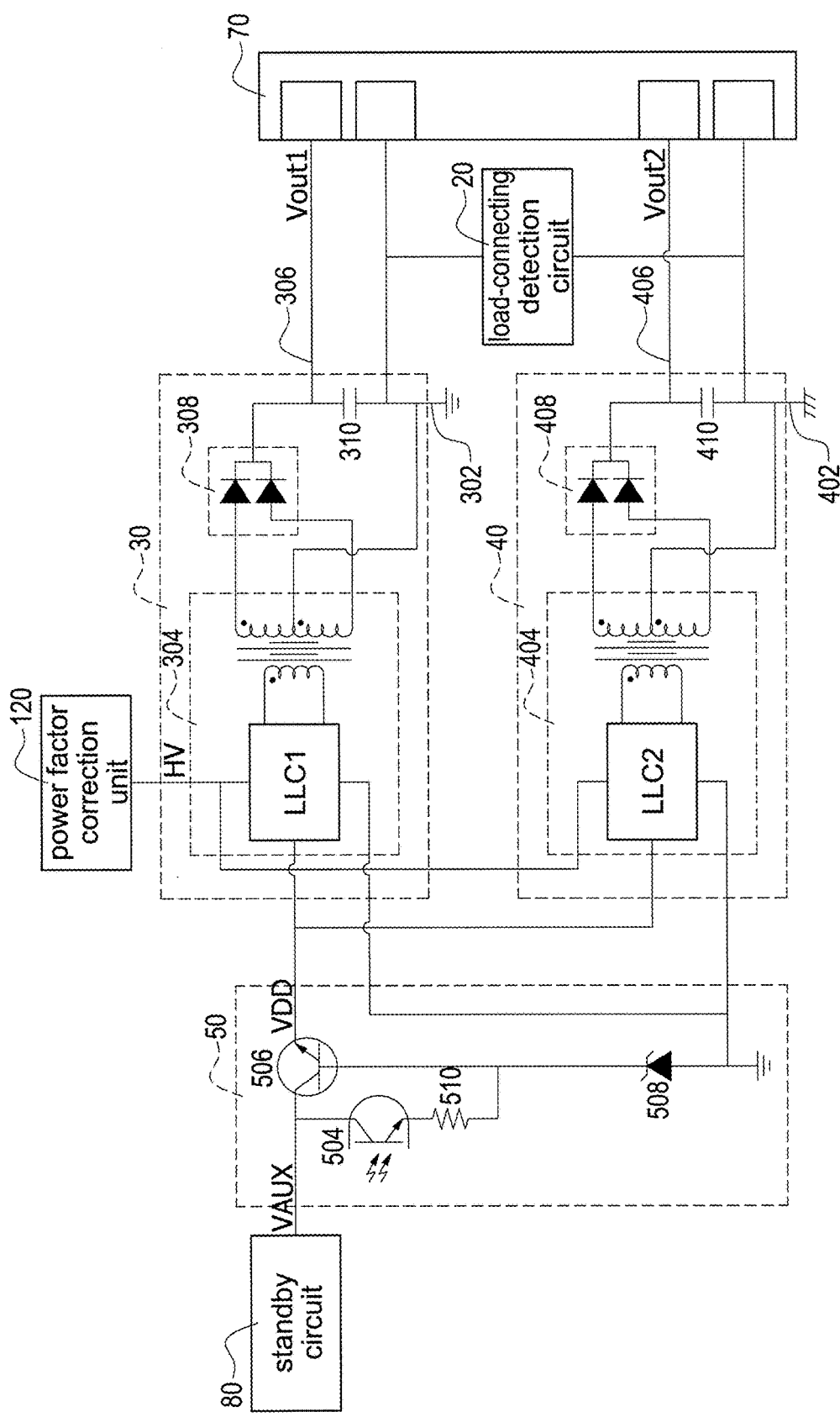
FIG. 6 shows a circuit diagram of an embodiment of the auxiliary voltage control circuit, the first power conversion circuit and the second power conversion circuit.

FIG. 6 shows a circuit diagram of an embodiment of the auxiliary voltage control circuit, the first power conversion circuit and the second power conversion circuit.

The auxiliary voltage control circuit 50 comprises a photo coupler receiving side 504, an auxiliary voltage side transistor switch 506, a Zener diode 508 and an auxiliary voltage side resistor 510. The auxiliary voltage side transistor switch 506 is electrically connected to the standby circuit 80, the photo coupler receiving side 504, the auxiliary voltage side resistor 510, the Zener diode 508, the first power conversion circuit 30 and the second power conversion circuit 40.

As mentioned above, when the load apparatus 60 is not connected to the adapter 10, the voltages of the first ground side 302 and the second ground side 402 are different, so that the photo coupler transmitting side 214 does not send out the first signal. At this time, the photo coupler receiving side 504 does not receive the first signal and is not turned on, so that the auxiliary voltage side transistor switch 506 is turned off, and then the auxiliary voltage side transistor switch 506 does not send out the fourth voltage VDD. Namely, the auxiliary voltage control circuit 50 does not drive the first power conversion circuit 30 and the second power conversion circuit 40, so that the first power conversion circuit 30 and the second power conversion circuit 40 do not convert the first voltage HV into the first output voltage Vout1 and the second output voltage Vout2.

When the load apparatus 60 is not connected to the adapter 10, because the voltage of the first ground side 302 of the first power conversion circuit 30 is different from the voltage of the second ground side 402 of the second power conversion circuit 40, the first power conversion circuit 30 and the second power conversion circuit 40 are not driven and do not work and do not consume energy, so that the standby loss of the adapter 10 is decreased. The standby loss is less than 0.5 watt.

When the load apparatus 60 is connected to the adapter 10, the first ground side 302 is short-circuited to the second ground side 402, so that the photo coupler transmitting side 214 sends out the first signal. After the photo coupler receiving side 504 receives the first signal, the photo coupler receiving side 504 is turned on, so that the auxiliary voltage side transistor switch 506 is turned on by the third voltage VAUX, and then the auxiliary voltage side transistor switch 506 sends out the fourth voltage VDD. Namely, the auxiliary voltage control circuit 50 sends out the fourth voltage VDD to drive the first power conversion circuit 30 and the second power conversion circuit 40, so that the first power conversion circuit 30 and the second power conversion circuit 40 start to convert the first voltage HV into the first output voltage Vout1 and the second output voltage Vout2 to send to the load apparatus 60. After the auxiliary voltage side transistor switch 506 is turned on, the electrical characteristics of the Zener diode 508 render to clamp the third voltage VAUX to generate and provide the fourth voltage VDD.

When the load apparatus 60 is connected to the adapter 10, the first ground side 302 of the first power conversion circuit 30 is short-circuited to the second ground side 402 of the second power conversion circuit 40, so that the first power conversion circuit 30 and the second power conversion circuit 40 are driven to supply power to the load apparatus 60. Therefore, the auto re-starting of the adapter 10 is quick and accurate.

The first power conversion circuit 30 comprises a first converter 304, a first diode circuit 308 and a first output side capacitor 310. The first converter 304 comprises a first resonant conversion circuit LLC1. The first converter 304 is electrically connected to the power factor correction unit 120 and the auxiliary voltage control circuit 50. The first diode circuit 308 is electrically connected to the first converter 304. The first output side capacitor 310 is electrically connected to the first diode circuit 308, the first converter 304, the first ground side 302 and the load-connecting detection circuit 20. When the first converter 304 receives the fourth voltage VDD, the first converter 304 starts to convert the first voltage HV into the first output voltage Vout1, and then the first converter 304 sends the first output voltage Vout1 to the first output side 306.

The second power conversion circuit 40 comprises a second converter 404, a second diode circuit 408 and a second output side capacitor 410. The second converter 404 comprises a second resonant conversion circuit LLC2. The second converter 404 is electrically connected to the power factor correction unit 120 and the auxiliary voltage control circuit 50. The second diode circuit 408 is electrically connected to the second converter 404. The second output side capacitor 410 is electrically connected to the second diode circuit 408, the second converter 404, the second ground side 402 and the load-connecting detection circuit 20. When the second converter 404 receives the fourth voltage VDD, the second converter 404 starts to convert the first voltage HV into the second output voltage Vout2, and then the second converter 404 sends the second output voltage Vout2 to the second output side 406.

Figure 2:
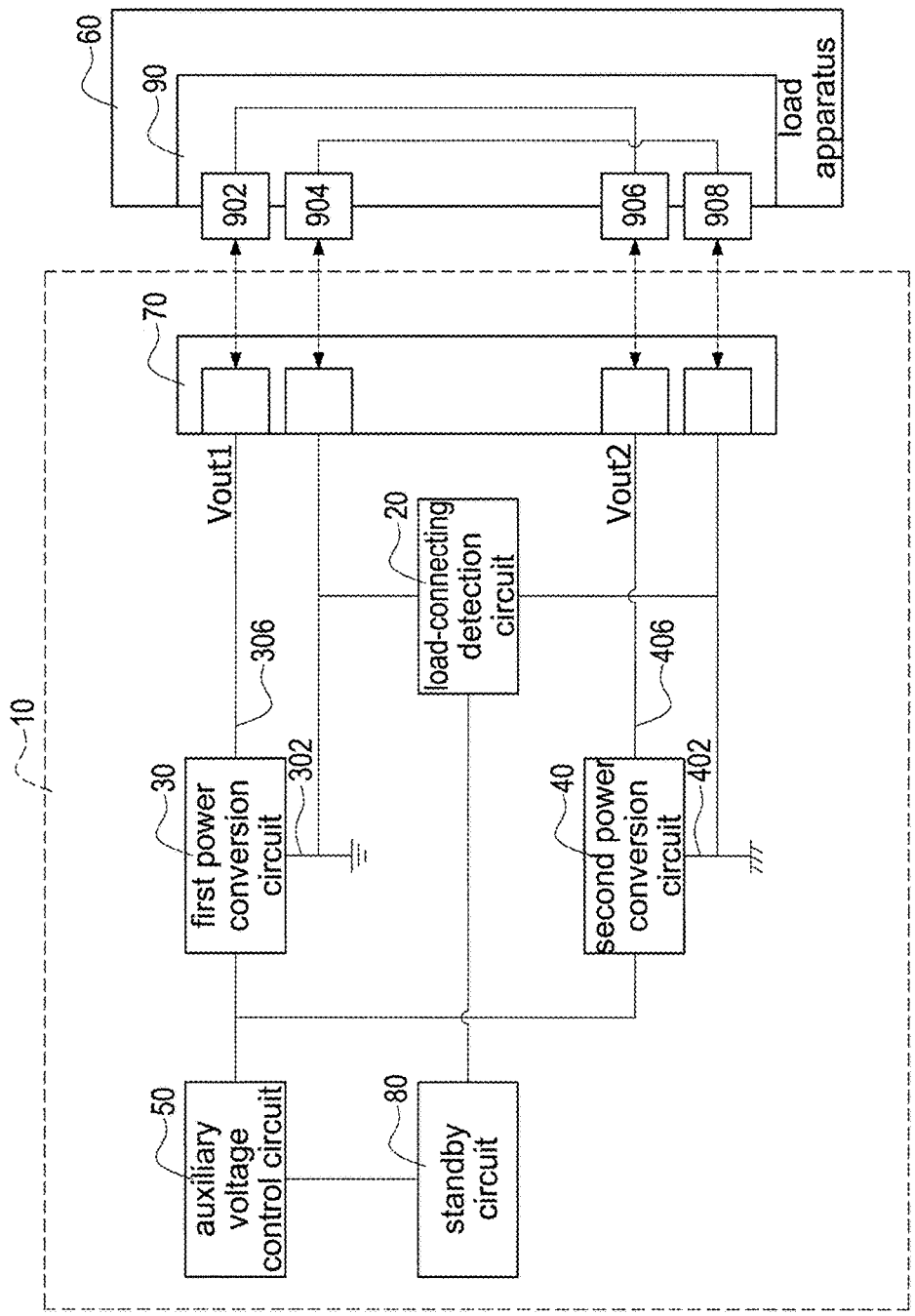
FIG. 2 shows a circuit diagram of the first embodiment of the first ground side and the second ground side forming the short circuit.

FIG. 2 shows a circuit diagram of the first embodiment of the first ground side and the second ground side forming the short circuit. The adapter 10 further comprises the first connector 70. The first connector 70 is electrically connected to the first output side 306, the first ground side 302, the second output side 406 and the second ground side 402. The load apparatus 60 comprises a second connector 90. The second connector 90 comprises a power input side 902, a ground side 904, a first conducting side 906 and a second conducting side 908. The first conducting side 906 is connected to the power input side 902 in parallel. The second conducting side 908 is connected to the ground side 904 in parallel. When the first connector 70 is connected to the second connector 90, the first output side 306 is connected to the power input side 902, the second output side 406 is connected to the first conducting side 906, the first ground side 302 is connected to the ground side 904, and the second ground side 402 is connected to the second conducting side 908. Therefore, the first ground side 302 being short-circuited to the second ground side 402 is achieved.

Figure 3:
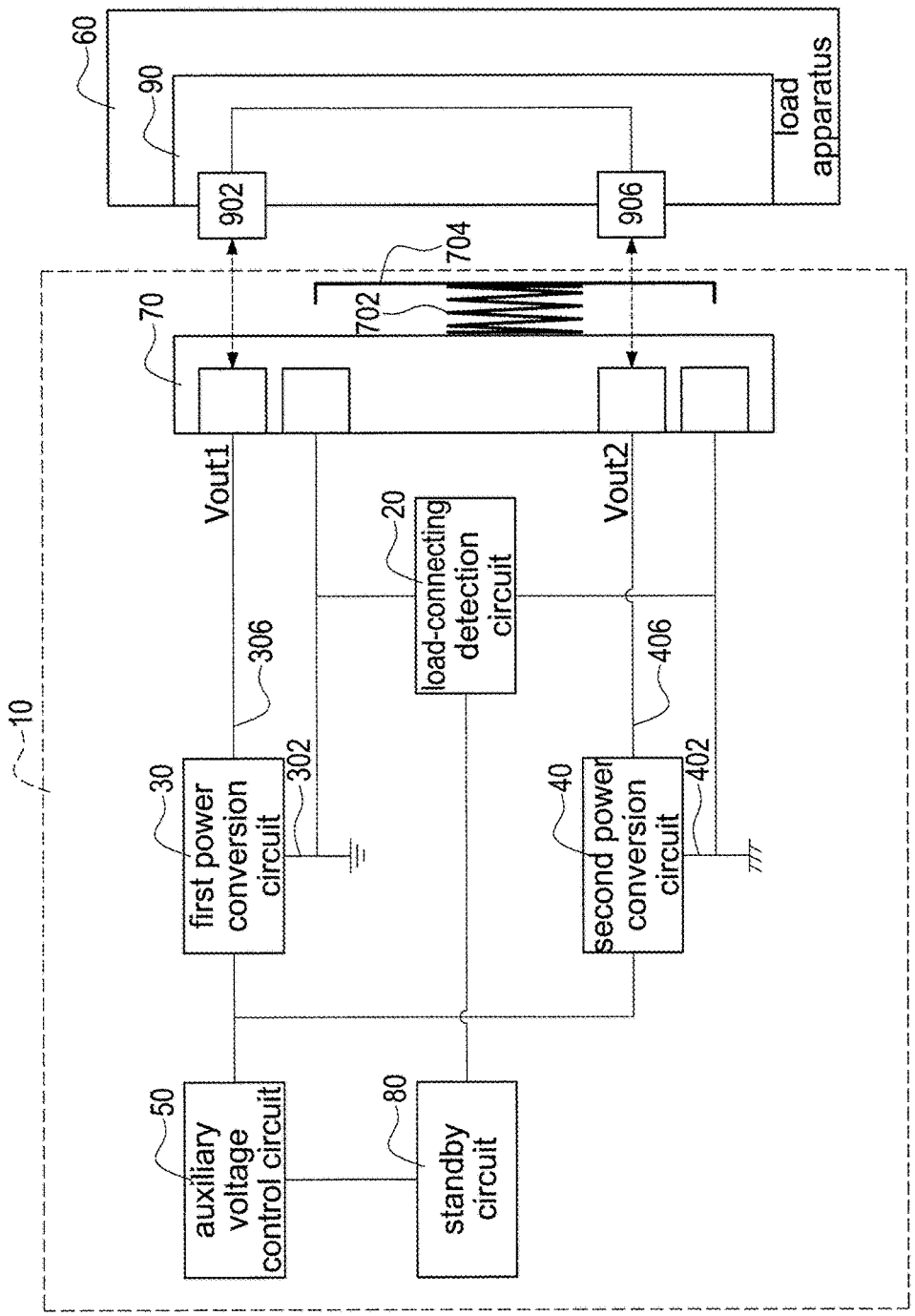
FIG. 3 shows a circuit diagram of the second embodiment of the first ground side and the second ground side forming the short circuit.

FIG. 3 shows a circuit diagram of the second embodiment of the first ground side and the second ground side forming the short circuit. The adapter 10 further comprises the first connector 70, a short-circuited component 704 and an elastic component 702. The first connector 70 is electrically connected to the first output side 306, the first ground side 302, the second output side 406 and the second ground side 402. The elastic component 702 is connected to the first connector 70 and the short-circuited component 704, so that the short-circuited component 704 has a certain distance from the first connector 70. The load apparatus 60 comprises a second connector 90. The second connector 90 comprises a power input side 902 and a first conducting side 906. The first conducting side 906 is connected to the power input side 902 in parallel. When the first connector 70 is connected to the second connector 90, the second connector 90 pushes the short-circuited component 704 to compress the elastic component 702, so that the first ground side 302 is short-circuited to the second ground side 402 through the short-circuited component 704.

As shown in FIG. 3, the part of the first connector 70 connecting to the first output side 306, the part of the first connector 70 connecting to the second output side 406, the power input side 902 and the first conducting side 906 are located in the same horizontal line. The part of the first connector 70 connecting to the first ground side 302, the part of the first connector 70 connecting to the second ground side 402, the elastic component 702 and the short-circuited component 704 are located in another horizontal line. Therefore, when the first connector 70 is connected to the second connector 90, the first output side 306 is connected to the second output side 406 through the power input side 902 and the first conducting side 906. The second connector 90 pushes the short-circuited component 704 to compress the elastic component 702, so that the first ground side 302 is short-circuited to the second ground side 402 through the short-circuited component 704. Namely, the first ground side 302 is connected to the second ground side 402 through the short-circuited component 704.

Figure 4:
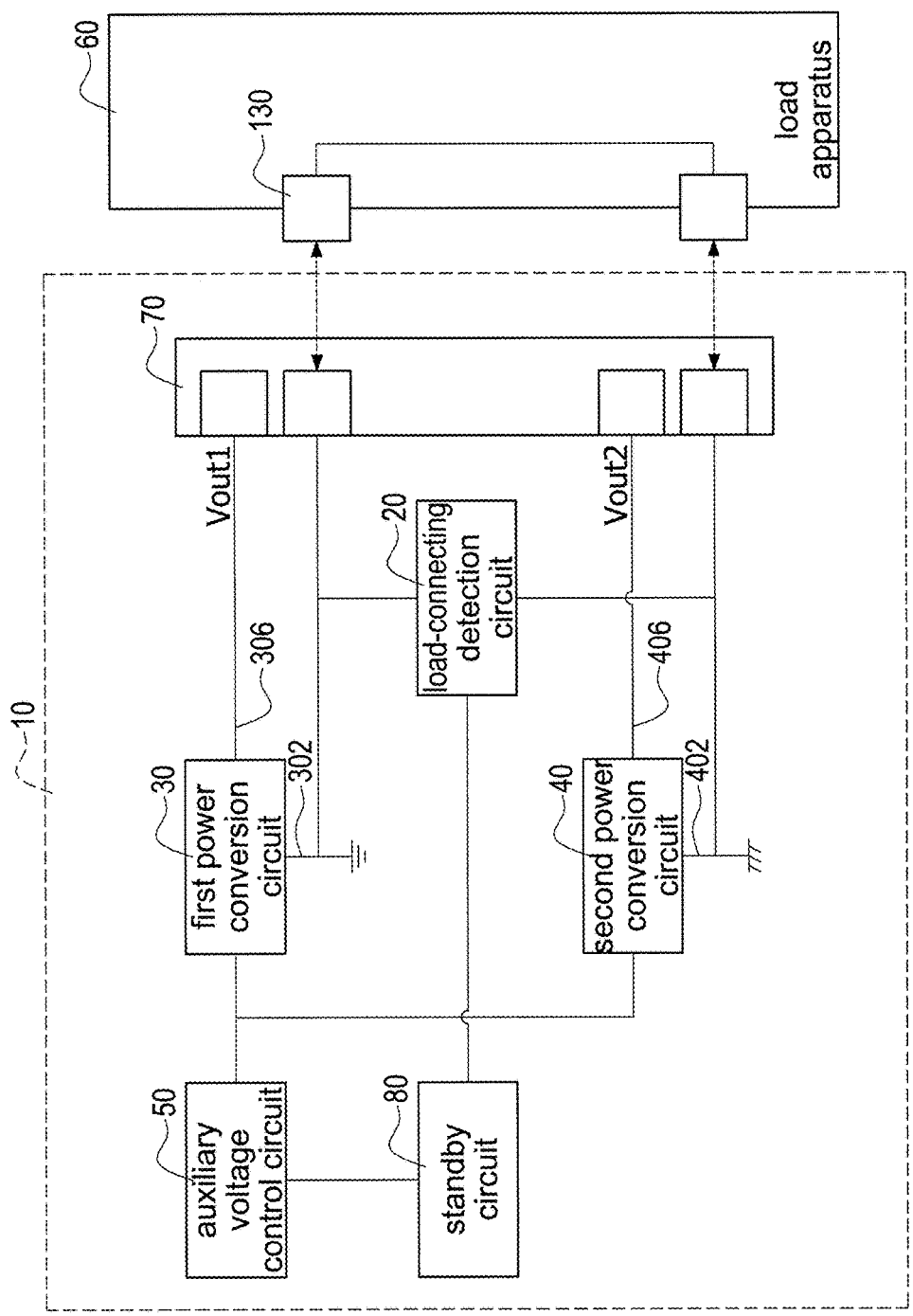
FIG. 4 shows a circuit diagram of the third embodiment of the first ground side and the second ground side forming the short circuit.

FIG. 4 shows a circuit diagram of the third embodiment of the first ground side and the second ground side forming the short circuit. The load apparatus 60 comprises a short circuit 130. When the load apparatus 60 is connected to the adapter 10, the first ground side 302 is short-circuited to the second ground side 402 through the short circuit 130.

The advantage of the present invention is that when the load apparatus 60 is not connected to the adapter 10, because the voltage of the first ground side 302 of the first power conversion circuit 30 is different from the voltage of the second ground side 402 of the second power conversion circuit 40, the first power conversion circuit 30 and the second power conversion circuit 40 are not driven and do not work and do not consume energy, so that the standby loss of the adapter 10 is very low. When the load apparatus 60 is connected to the adapter 10, the first ground side 302 of the first power conversion circuit 30 is short-circuited to the second ground side 402 of the second power conversion circuit 40, so that the voltage of the first ground side 302 of the first power conversion circuit 30 is the same with the second ground side 402 of the second power conversion circuit 40, so that the first power conversion circuit 30 and the second power conversion circuit 40 are driven to supply power to the load apparatus 60. Therefore, the auto re-starting of the adapter 10 is quick and accurate.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An adapter with low standby loss supplying power to a load apparatus, the adapter comprising:
   a rectifying unit;
   a power factor correction unit electrically connected to the rectifying unit, the power factor correction unit sending out a first voltage;

a standby circuit electrically connected to the power factor correction unit, the standby circuit converting the first voltage into a second voltage and a third voltage;

a load-connecting detection circuit electrically connected to the standby circuit, the load-connecting detection circuit receiving the second voltage;

a first power conversion circuit electrically connected to the power factor correction unit, the first power conversion circuit comprising a first output side and a first ground side, the first ground side electrically connected to the load-connecting detection circuit;

a second power conversion circuit electrically connected to the power factor correction unit, the second power conversion circuit comprising a second output side and a second ground side, the second ground side electrically connected to the load-connecting detection circuit, the first ground side and the second ground side connected to different grounds; and an auxiliary voltage control circuit electrically connected to the standby circuit, the first power conversion circuit and the second power conversion circuit, the auxiliary voltage control circuit receiving the third voltage, wherein when the load apparatus is not connected to the adapter, a voltage of the first ground side is different from a voltage of the second ground side, so that the load-connecting detection circuit does not send out a first signal; the auxiliary voltage control circuit does not receive the first signal, so that the auxiliary voltage control circuit does not drive the first power conversion circuit and the second power conversion circuit, so that the first power conversion circuit and the second power conversion circuit does not convert the first voltage into a first output voltage and a second output voltage;

wherein when the load apparatus is connected to the adapter, the first ground side is short-circuited to the second ground side, so that the load-connecting detection circuit is turned on and sends out the first signal; after the auxiliary voltage control circuit receives the first signal, the auxiliary voltage control circuit is turned on to send out a fourth voltage to drive the first power conversion circuit and the second power conversion circuit, so that the first power conversion circuit and the second power conversion circuit start to convert the first voltage into the first output voltage and the second output voltage.

2. The adapter in claim 1, wherein the load-connecting detection circuit comprises:
a first transistor switch electrically connected to the standby circuit, the first ground side and the second ground side;
a photo coupler transmitting side electrically connected to the standby circuit and the first transistor switch; and
a second transistor switch electrically connected to the photo coupler transmitting side, the standby circuit, the first transistor switch and the second ground side,
wherein when the load apparatus is connected to the adapter, the first ground side is short-circuited to the second ground side, so that the first transistor switch is turned off, and then the second transistor switch is turned on by the second voltage, and then the photo coupler transmitting side is turned on, and then the photo coupler transmitting side sends out the first signal.

3. The adapter in claim 2, wherein the load-connecting detection circuit further comprises:
a first resistor electrically connected to the standby circuit, the first transistor switch and the first ground side;

a second resistor electrically connected to the first transistor switch, the first ground side, the first resistor, the second ground side and the second transistor switch;
a third resistor electrically connected to the standby circuit, the first resistor, the first transistor switch and the second transistor switch;
a first capacitor electrically connected to the first transistor switch, the first ground side, the first resistor, the second ground side, the second resistor and the second transistor switch; and
a fourth resistor electrically connected to the standby circuit, the first resistor, the third resistor and the photo coupler transmitting side.

4. The adapter in claim 2, wherein the auxiliary voltage control circuit comprises:
a photo coupler receiving side electrically connected to the standby circuit; and
an auxiliary voltage side transistor switch electrically connected to the standby circuit, the photo coupler receiving side, the first power conversion circuit and the second power conversion circuit,
wherein after the photo coupler receiving side receives the first signal, the photo coupler receiving side is turned on, so that the auxiliary voltage side transistor switch is turned on by the third voltage, and then the auxiliary voltage side transistor switch sends out the fourth voltage.

5. The adapter in claim 4, wherein the auxiliary voltage control circuit further comprises:
a zener diode electrically connected to the auxiliary voltage side transistor switch, the first power conversion circuit and the second power conversion circuit; and
an auxiliary voltage side resistor electrically connected to the photo coupler receiving side, the auxiliary voltage side transistor switch and the zener diode.

6. The adapter in claim 1, wherein the first power conversion circuit comprises:
a first converter electrically connected to the power factor correction unit and the auxiliary voltage control circuit;
a first diode circuit electrically connected to the first converter; and
a first output side capacitor electrically connected to the first diode circuit, the first converter, the first ground side and the load-connecting detection circuit,
wherein when the first converter receives the fourth voltage, the first converter starts to convert the first voltage into the first output voltage, and then the first converter sends the first output voltage to the first output side.

7. The adapter in claim 1, wherein the second power conversion circuit comprises:
a second converter electrically connected to the power factor correction unit and the auxiliary voltage control circuit;
a second diode circuit electrically connected to the second converter; and
a second output side capacitor electrically connected to the second diode circuit, the second converter, the second ground side and the load-connecting detection circuit,
wherein when the second converter receives the fourth voltage, the second converter starts to convert the first voltage into the second output voltage, and then the second converter sends the second output voltage to the second output side.

8. The adapter in claim 1 further comprising:
a current balance unit electrically connected to the first power conversion circuit, the first output side, the second power conversion circuit and the second output side,
wherein the current balance unit detects current values of the first output side and the second output side, and sends out a second signal to the first power conversion circuit and the second power conversion circuit.

9. An electronic system with low standby loss comprising:
an adapter; and
a load apparatus electrically connected to the adapter,
wherein the adapter comprises:
a rectifying unit;
a power factor correction unit electrically connected to the rectifying unit, the power factor correction unit sending out a first voltage;
a standby circuit electrically connected to the power factor correction unit, the standby circuit converting the first voltage into a second voltage and a third voltage;
a load-connecting detection circuit electrically connected to the standby circuit, the load-connecting detection circuit receiving the second voltage;
a first power conversion circuit electrically connected to the power factor correction unit, the first power conversion circuit comprising a first output side and a first ground side, the first ground side electrically connected to the load-connecting detection circuit;
a second power conversion circuit electrically connected to the power factor correction unit, the second power conversion circuit comprising a second output side and a second ground side, the second ground side electrically connected to the load-connecting detection circuit, the first ground side and the second ground side connected to different grounds; and
an auxiliary voltage control circuit electrically connected to the standby circuit, the first power conversion circuit and the second power conversion circuit, the auxiliary voltage control circuit receiving the third voltage,
wherein when the load apparatus is not connected to the adapter, a voltage of the first ground side is different from a voltage of the second ground side, so that the load-connecting detection circuit does not send out a first signal; the auxiliary voltage control circuit does not receive the first signal, so that the auxiliary voltage control circuit does not drive the first power conversion circuit and the second power conversion circuit, so that the first power conversion circuit and the second power conversion circuit does not convert the first voltage into a first output voltage and a second output voltage;
wherein when the load apparatus is connected to the adapter, the first ground side is short-circuited to the second ground side, so that the load-connecting detection circuit is turned on and sends out the first signal; after the auxiliary voltage control circuit receives the first signal, the auxiliary voltage control circuit is turned on to send out a fourth voltage to drive the first power conversion circuit and the second power conversion circuit, so that the first power conversion circuit and the second power conversion circuit start to convert the first voltage into the first output voltage and the second output voltage.

10. The electronic system in claim 9, wherein the adapter further comprises:
a first connector electrically connected to the first output side, the first ground side, the second output side and the second ground side,
wherein the load apparatus comprises:
a second connector comprising a power input side, a ground side, a first conducting side and a second conducting side, the first conducting side connected to the power input side in parallel, the second conducting side connected to the ground side in parallel,
wherein when the first connector is connected to the second connector, the first output side is connected to the power input side, the second output side is connected to the first conducting side, the first ground side is connected to the ground side, and the second ground side is connected to the second conducting side.

11. The electronic system in claim 9, wherein the adapter further comprises:
a first connector electrically connected to the first output side, the first ground side, the second output side and the second ground side;
a short-circuited component; and
an elastic component connected to the first connector and the short-circuited component, so that the short-circuited component has a certain distance from the first connector,
wherein the load apparatus comprises:
a second connector comprising a power input side and a first conducting side, the first conducting side connected to the power input side in parallel,
wherein when the first connector is connected to the second connector, the second connector pushes the short-circuited component to compress the elastic component, so that the first ground side is short-circuited to the second ground side through the short-circuited component.

12. The electronic system in claim 9, wherein the load apparatus comprises:
a short circuit,
wherein when the load apparatus is connected to the adapter, the first ground side is short-circuited to the second ground side through the short circuit.

13. The electronic system in claim 9, wherein the load-connecting detection circuit comprises:
a first transistor switch electrically connected to the standby circuit, the first ground side and the second ground side;
a photo coupler transmitting side electrically connected to the standby circuit and the first transistor switch; and
a second transistor switch electrically connected to the photo coupler transmitting side, the standby circuit, the first transistor switch and the second ground side,
wherein when the load apparatus is connected to the adapter, the first ground side is short-circuited to the second ground side, so that the first transistor switch is turned off, and then the second transistor switch is turned on by the second voltage, and then the photo coupler transmitting side is turned on, and then the photo coupler transmitting side sends out the first signal.

14. The electronic system in claim 13, wherein the load-connecting detection circuit further comprises:
a first resistor electrically connected to the standby circuit, the first transistor switch and the first ground side;
a second resistor electrically connected to the first transistor switch, the first ground side, the first resistor, the second ground side and the second transistor switch;
a third resistor electrically connected to the standby circuit, the first resistor, the first transistor switch and the second transistor switch;

a first capacitor electrically connected to the first transistor switch, the first ground side, the first resistor, the second ground side, the second resistor and the second transistor switch; and a fourth resistor electrically connected to the standby circuit, the first resistor, the third resistor and the photo coupler transmitting side.

15. The electronic system in claim 13, wherein the auxiliary voltage control circuit comprises:

a photo coupler receiving side electrically connected to the standby circuit; and an auxiliary voltage side transistor switch electrically connected to the standby circuit, the photo coupler receiving side, the first power conversion circuit and the second power conversion circuit, wherein after the photo coupler receiving side receives the first signal, the photo coupler receiving side is turned on, so that the auxiliary voltage side transistor switch is turned on by the third voltage, and then the auxiliary voltage side transistor switch sends out the fourth voltage.

16. The electronic system in claim 15, wherein the auxiliary voltage control circuit further comprises:

a zener diode electrically connected to the auxiliary voltage side transistor switch, the first power conversion circuit and the second power conversion circuit; and an auxiliary voltage side resistor electrically connected to the photo coupler receiving side, the auxiliary voltage side transistor switch and the zener diode.

17. The electronic system in claim 9, wherein the first power conversion circuit comprises:

a first converter electrically connected to the power factor correction unit and the auxiliary voltage control circuit;

a first diode circuit electrically connected to the first converter; and a first output side capacitor electrically connected to the first diode circuit, the first converter, the first ground side and the load-connecting detection circuit, wherein when the first converter receives the fourth voltage, the first converter starts to convert the first voltage into the first output voltage, and then the first converter sends the first output voltage to the first output side.

18. The electronic system in claim 9, wherein the second power conversion circuit comprises:

a second converter electrically connected to the power factor correction unit and the auxiliary voltage control circuit;

a second diode circuit electrically connected to the second converter; and a second output side capacitor electrically connected to the second diode circuit, the second converter, the second ground side and the load-connecting detection circuit, wherein when the second converter receives the fourth voltage, the second converter starts to convert the first voltage into the second output voltage, and then the second converter sends the second output voltage to the second output side.

19. The electronic system in claim 9, wherein the adapter further comprises:

a current balance unit electrically connected to the first power conversion circuit, the first output side, the second power conversion circuit and the second output side, wherein the current balance unit detects current values of the first output side and the second output side, and sends out a second signal to the first power conversion circuit and the second power conversion circuit.

* * * * *